(12) United States Patent
Gao et al.

(10) Patent No.: US 6,850,888 B1
(45) Date of Patent: Feb. 1, 2005

(54) METHODS AND APPARATUS FOR TRAINING A PATTERN RECOGNITION SYSTEM USING MAXIMAL RANK LIKELIHOOD AS AN OPTIMIZATION FUNCTION

(75) Inventors: Yuqing Gao, Mount Kisco, NY (US); Yongxin Li, Ossining, NY (US); Michael Alan Picheny, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 388 days.

(21) Appl. No.: 09/680,706

(22) Filed: Oct. 6, 2000

(51) Int. Cl.$^7$ .............................................. G10L 15/00
(52) U.S. Cl. ..................................... 704/256; 704/250
(58) Field of Search ............................... 704/200, 231, 704/243, 245, 250, 256, 244

(56) References Cited

U.S. PATENT DOCUMENTS

| | | | | |
|---|---|---|---|---|
| 4,587,670 A | * | 5/1986 | Levinson et al. | 704/256 |
| 5,579,436 A | * | 11/1996 | Chou et al. | 704/256 |
| 5,950,158 A | * | 9/1999 | Wang | 704/244 |
| 5,963,902 A | * | 10/1999 | Wang | 704/243 |
| 5,963,906 A | * | 10/1999 | Turin | 704/256 |
| 6,044,344 A | * | 3/2000 | Kanevsky | 704/256 |
| 6,246,980 B1 | * | 6/2001 | Glorion et al. | 704/231 |
| 6,493,667 B1 | * | 12/2002 | de Souza et al. | 704/240 |

OTHER PUBLICATIONS

Bahl et al., "Estimating Hidden Markov Model Parameters So As To Maximize Speech Recognition Accuracy," IEEE Transactions on Speech and Audio Processing, vol. 1, No. 1, Jan. 1993, 77–83.

Chou et al., "Minimum Error Rate Training Based on N–Best String Models," II–652–II–655 (1993 IEEE).

Normandin et al., "High–Performance Connected Digit Recognition Using Maximum Mutual Information Estimation," 299–311 (1994 IEEE).

Bahl et al., "Discriminative Training of Gaussian Mixture Models for Large Vocabulary Speech Recognition Systems," 613–616 (1996 IEEE).

Valtchev et al., "Lattice–Based Discriminative Training for Large Vocabulary Speech Recognition," 605–612 (1996 IEEE).

Woodland et al., "Large Scale Discrimination Training for Speech Recognition," Cambridge University Engineering Department, Cambridge, CB2 1PZ, UK, 7–15 (ASR2000).

Povey et al., "Frame Discrimination Training of HMMs for Large Vocabulary Speech Recognition," Cambridge University Engineering Department, Cambridge, CB2 1PZ, UK, 1–13.

Gelin–Huet et al., "The Deterministic Annealing Approach for Discriminative Continuous HMM Design," Signal Compression Lab, Department of Electrical and Computer Engineering, University of California, Santa Barbara, CA.

* cited by examiner

*Primary Examiner*—Daniel Abebe
(74) *Attorney, Agent, or Firm*—Ryan, Mason & Lewis, LLP; Thu Ann Dang, Esq.

(57) ABSTRACT

A method and apparatus are disclosed for training a pattern recognition system, such as a speech recognition system, using an improved objective function. The concept of rank likelihood, previously applied only to the decding process, is applied in a novel manner to the parameter estimation of the training phase of a pattern recognition system. The disclosed objective function is based on a pseudo-rank likelihood that not only maximizes the likelihood of an observation for the correct class, but also minimizes the likelihoods of the observation for all other classes, such that the discrimination between classes is maximized. A training process is disclosed that utilizes the pseudo-rank likelihood objective function to identify model parameters that will result in a pattern recognizer with the lowest possible recognition error rate. The discrete nature of the rank-based rank likelihood objective function is transformed to allow the parameter estimations to be optimized during the training phase.

31 Claims, 2 Drawing Sheets

METHODS AND APPARATUS FOR TRAINING A PATTERN RECOGNITION SYSTEM USING MAXIMAL RANK LIKELIHOOD AS AN OPTIMIZATION FUNCTION

FIELD OF THE INVENTION

The present invention relates generally to the data classification systems, such as speech recognition systems and, more particularly, to methods and apparatus for training a pattern recognition system utilizing an improved objective function.

BACKGROUND OF THE INVENTION

Pattern recognition and data classification techniques, often referred to as supervised learning, attempt to find an approximation or hypothesis to a target concept that assigns objects (such as processes or events) into different categories or classes. Pattern recognition can normally be divided into two phases, namely, a training phase and a testing phase. The training phase applies a learning algorithm to training data. The training data is typically comprised of descriptions of objects (a set of feature variables) together with the correct classification for each object (the class variable).

The goal of the training phase is to find correlations between object descriptions to learn how to classify the objects. In speech recognition systems, for example, the goal of the training phase is to find the Hidden Markov Model (HMM) parameters that will result in a speech recognizer with the lowest possible recognition error rate. The training data is used to construct models in which the class variable may be predicted in a record in which the observations are given but the class variables for each observation needs need to be determined. Thus, the end result of the training phase is a model or hypothesis (e.g., a set of rules) that can be used to predict the class of new objects. The testing phase uses the model derived in the training phase to predict the class of testing objects. The classifications made by the model is compared to the true object classes to estimate the accuracy of the model.

More specifically, the training or adaptation is typically done by maximizing some objective function, $F(\lambda)$. Maximum likelihood as an optimization criterion has been widely used in many aspects of speech recognition. One successful example is estimating the HMM model parameters, $\lambda$, in such a way that the likelihood (probability) of the observation sequence, $O=(o_1, o_2, \ldots, o_T)$, given the current model parameters, $P(O|\lambda)$, is locally maximized using an iterative procedure such as the Baum-Welch method.

A meaningful objective function should satisfy conditions that, whenever $F(\hat{\lambda})>F(\lambda)$, $\hat{\lambda}$ results in a better classifier or decoder than $\lambda$. This is not always true, however, when the likelihood $P(O|\lambda)$ is used as the objective function because there is no direct relation between the likelihood and the recognition error rate. A need therefore exists for an improved objective function that not only maximizes the discrimination between classes of training data, but also moves the criterion used in parameter estimation of a speech recognition system closer to the decoding criterion, therefore reducing the recognition error rate.

SUMMARY OF THE INVENTION

Generally, a method and apparatus are disclosed for training a pattern recognition system, such as a speech recognition system, using an improved objective function, referred to as the Maximal Rank Likelihood (MRL), based on a pseudo-rank likelihood that not only maximizes the likelihood of an observation for the correct class, but also minimizes the likelihoods of the observation for all other classes, such that the discrimination between classes is maximized. Thus, the present invention applies well-known decoding criterion to the parameter estimation of the training phase of a pattern recognition system. A training process is disclosed that utilizes the pseudo-rank likelihood objective function to identify model parameters that will result in a pattern recognizer with the lowest possible recognition error rate.

Rank-based decoding techniques utilize rank likelihoods to evaluate all the classes in the system, in order to decide which class is the correct one for the given observation. The present invention utilizes the rank likelihood as an objective function, to make the training phase discriminative. In addition, the training criterion is now the same as the decoding criterion. According to a further aspect of the invention, the discrete nature of the rank-based rank likelihood objective function is transformed to allow the parameter estimations to be optimized during the training phase. Thus, in order to make rank likelihood suitable for use in the training phase, the present invention utilizes a pseudo rank, a pseudo rank likelihood and a new objective function which is based on the pseudo rank likelihood.

Three exemplary applications of the Maximal Rank Likelihood are also disclosed. First, a Linear Discriminative Projection is disclosed that optimizes the objective function using all training data and projects feature vectors into a discriminative space with a reduced dimension. The second and third applications are a feature space transformation and a model space transformation, respectively, for adaptation. The transformations are optimized to maximize the rank likelihood of the adaptation data.

A more complete understanding of the present invention, as well as further features and advantages of the present invention, will be obtained by reference to the following detailed description and drawings.

DETAILED DESCRIPTION OF PREFERRED EMBODIMENTS

Figure 1:
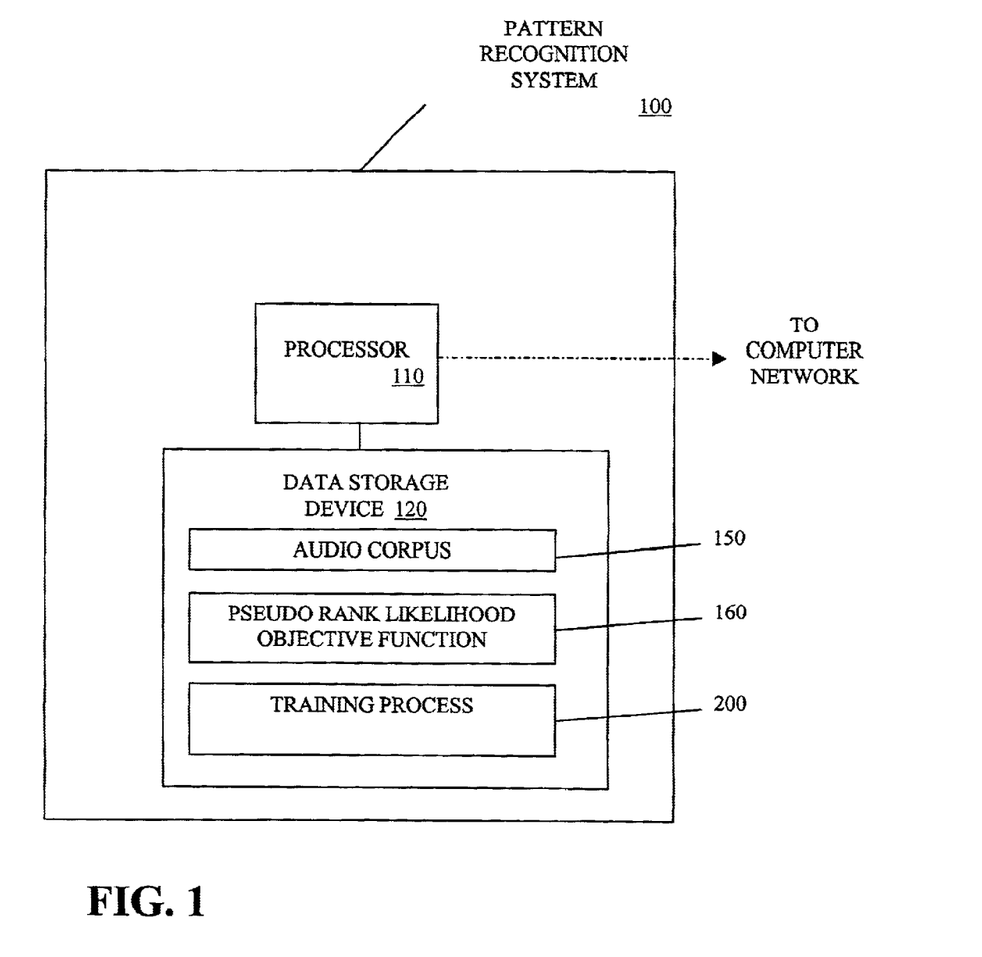
FIG. 1 is a schematic block diagram showing the architecture of an illustrative pattern recognition system in accordance with the present invention.

FIG. 1 is a block diagram showing the architecture of an illustrative pattern recognition evaluation system 100 in accordance with the present invention. The pattern recognition evaluation system 100 may be embodied as a general purpose computing system, such as the general purpose computing system shown in FIG. 1. The pattern recognition evaluation system 100 includes a processor 110 and related memory, such as a data storage device 120, which may be distributed or local. The processor 110 may be embodied as a single processor, or a number of local or distributed processors operating in parallel. The data storage device 120 and/or a read only memory (ROM) are operable to store one or more instructions, which the processor 110 is operable to retrieve, interpret and execute. While the present invention is illustrated in a speech recognition environment, the present invention may be applied to the training phase of any pattern recognition system, as would be apparent to a person of ordinary skill in the art.

The data storage device 120 preferably includes an audio corpus database 150 for storing one or more prerecorded or live audio or video files (or both) that can be used for training and evaluation in accordance with the present invention. Generally, according to one feature of the present invention discussed further below, the data classification system 100 utilizes an improved objective function 160 based on a pseudo-rank likelihood that not only maximizes the likelihood of an observation for the correct class, but also minimizes the likelihoods of the observation for all other classes, such that the discrimination between classes is maximized. Thus, the present invention applies a decoding criterion to the parameter estimation of the training phase of a speech recognition system. Thus, the training and subsequent testing (decoding) are based on the same criteria.

As discussed further below in conjunction with FIG. 2, the data storage device 120 also includes an improved training process 200. Generally, the training process 200 utilizes the pseudo-rank likelihood objective function 160 to identify model parameters that will result in a speech recognizer with the lowest possible recognition error rate.

Rank-Based Decoding Procedures

For a detailed discussion of decoding procedures for a rank based speech recognition system, see, e.g., Bahl et. al, "Robust-Methods for Using Context-Dependent Features and Models in a Continuous Speech Recognizer," ICASSP 1994, Vol. 1, 533–536 (1994), incorporated by reference herein Generally, during decoding, instead of Gaussian likelihoods, rank likelihoods are used to form search paths in order to achieve better robustness. Thus, each observation in an observation sequence $O=(o_1, o_2, \ldots, o_T)$ is applied to each state, where each state has associated Gaussians. The observation is compared with each state to obtain the corresponding likelihood.

The rank likelihood is then obtained from a pre-computed rank likelihood distribution, which typically has a peak at rank one and rapidly falls off to low probabilities for lower ranks. Gaussian likelihoods are used to rank all HMM states, given an observation vector of a frame of speech. Each frame has a state list associated with it, where all the states are sorted in the decreasing order of the Gaussian likelihood. The decoding performance of a system depends on the quality of the rank lists. One way to improve the system performance is to make the correct state for every frame to appear on the top positions of the rank list, i.e., to make every frame have higher rank, therefore improving the rank likelihoods of the correct states.

Given an observation vector $o_t$ (corresponding to a frame of speech), the rank $r(o_t)$ for this observation is defined as the number of other (confusable) states $l^i$ which have higher Gaussian likelihoods than the correct state $l^c$ conditioned on the correct transcription and alignment. Thus, the rank $r(o_t)$ for the observation vector $o_t$ may be expressed as follows:

$$r(o_t) = \sum_{l^i=1, l^i \neq l^c}^{L} \sigma\left(\log \frac{p(o_t|l^c)}{p(o_t|l^i)}\right) \tag{1}$$

where $p(o_t|l^c)$ is the likelihood of $o^t$ given the correct state $l^c$, and $p(o_t|l^i)$ is the likelihood of $o^t$ given any other state $l^i$, $l^i \in$ {all states in the underlying system}. u(.) is a Step function as follows:

$$u(x) = \begin{bmatrix} 1 & \text{if } x \ 5.0 \\ 0 & \text{if } x > 0 \end{bmatrix}$$

For example, when the correct state is not the highest ranking state, the denominator value of $p(o_t|l^i)$ will be higher than the numerator value of $p(o_t|l^c)$ in Eq. (1), and the logarithm of a number less than one is negative. Thus, the step function, u(x) evaluates to a value of 1.

The rank likelihood of $o_t$ is defined as:

$$RL(o_t) = L(r(o_t)) \tag{2}$$

where $r(o_t)$ is the rank as in Eq. 1 and L(.) is a rank likelihood function. Although the rank likelihood function can be pre-computed as a histogram from a small portion of the training data, theoretically, any monotonic decreasing function can be used to represent this function.

From Eq. 1 and Eq. 2, it can be seen that in order to maximize the rank likelihood RL $(o_t)$, not only $p(o_t|l^c)$ should be maximized, but also all $p(o_t|l^i)$, $l^i \in$ {all HMM states} should be minimized relative to $p(o_t|l^i)$. So the rank likelihood is a discriminative function. If we choose to use the rank likelihood as an objective function, the training is discriminative, and also the training criterion becomes the same as the decoding criterion.

Applying Decoding Procedures to Training Phase Using Pseudo Rank Likelihood

The present invention recognizes that rank-based decoding procedures define the rank as a discrete function in Eq. 1. Therefore, the rank likelihood set forth in Eq. 2 cannot be used as an objective function directly. Specifically, the required differentiation of the step function, u(x), would result in an infinite value at the transition (x=0). In addition, the table look-up that is performed in the rank-based decoding procedure to translate the ranked lists to likelihood values cannot be performed in the optimization procedure required for the training phase. In other words, the optimization requires the ability to differentiate the step function and evaluate the change in the likelihood values. Thus, in order to make rank likelihood suitable for use in the training phase, the present invention utilizes a pseudo rank, a pseudo rank likelihood and a new objective function which is based on the pseudo rank likelihood.

Thus, to avoid the differentiation problems, a Sigmoid function $\sigma(x)$:

$$\sigma(x) = \frac{1}{1 + e^{\alpha x}} \tag{3}$$

is used to replace the Step function u(x) in Eq. 1.

The larger the value of $\alpha$, the closer that $\sigma(.)$ is to u(.). However, in practice, a large $\alpha$ could cause instability of $\sigma(.)$.

With this smoothed $\sigma(.)$, the pseudo rank is defined as:

$$r(o_t) = \sum_{l^i=1, l^i \neq l^c}^{L} \sigma\left(\log \frac{p(o_t|l^c)}{p(o_t|l^i)}\right) \tag{4}$$

Equation 4 has been found to be a good approximation to equation 1.

To avoid the table look-up problem, a reciprocal function is used as the rank likelihood in Eq. 2 as follows:

$$L(r) = \frac{1}{r+1} \quad (5)$$

The rank likelihood set forth in equation 5 is referred to as a pseudo rank likelihood and turns out to be similar to the pre-computed rank likelihood distribution. It is noted that the Sigmoid function $\sigma(x)$ and reciprocal function, $L(r)$, used by the present invention are merely exemplary functions that approximate the step function and likelihood table look-up procedures of the rank-based decoding procedures and other functions may be employed consistent with the present invention as would be apparent to a person of ordiinary skill in the art.

Given an observation sequence $O=(o_1, o_2, \ldots, o_T)$, the objective function 160 is defined as the average logarithm of the pseudo rank likelihood:

$$F = \frac{1}{T}\sum_{t=1}^{T}\log(L(r(o_t))) = \frac{1}{T}\sum_{t=1}^{T}\log\left(L\left(\sum_{i^i=1,i^i!=i^c}^{L} \sigma\left(\log\frac{p(o_t|l^c)}{p(o_t|l^i i)}\right)\right)\right) \quad (6)$$

Thus, equation (6) provides a new objective function for training, that is based on decoding criteria. The objective function in Equation 6 can theoretically replace the Gaussian likelihood to improve all MLE based algorithms.

Since there is no closed form solution to the problem of maximal pseudo-rank likelihood (i.e., no closed form for the differentiation of equation 6), the problem must be solved numerically. In fact, we search along the gradient direction of the objective function. Let $$d_\lambda(o_t, l^c, l^i) = \log\frac{p_\lambda(o_t|l^c)}{p_\lambda(o_t|l_i)}, \quad (7)$$

then the gradient of the objective function F with respect to $\lambda$ (the desired parameters of the recognition system to be optimal), $$\frac{\partial F}{\partial \lambda},$$

can be written as:

$$\frac{\partial F}{\partial \lambda} = \frac{1}{T}\sum_{t=1}^{T}\frac{1}{L(r(o_t))}\frac{\partial L(r(o_t))}{\partial r(o_t)}\sum_{i^i=1}^{L}\frac{\partial \sigma(d(o_t, l^c, l^i))}{\partial d(o_t, l^c, l^i)}\frac{\partial d(o_t, l^c, l^i)}{\partial \lambda} \quad (8)$$

where, $$\frac{\partial L(r(o_t))}{\partial r(o_t)} = -\frac{1}{(1+(r(o_t))^2}, \quad \frac{\partial \sigma(d(o_t, l^c, l^i))}{\partial d(o_t, l^c, l^i)} = \frac{-\alpha}{e^{\alpha d(o_t, l^c, l^i)} + e^{-\alpha d(o_t, l^c, l^i)} + 2}$$

For different applications, the term $$\frac{\partial d(o_t, l^c, l^i)}{\partial \lambda}$$

in Eq. 8 will be computed differently corresponding to different sets of parameters, $\lambda$'s. The rest will remain same.

Figure 2:
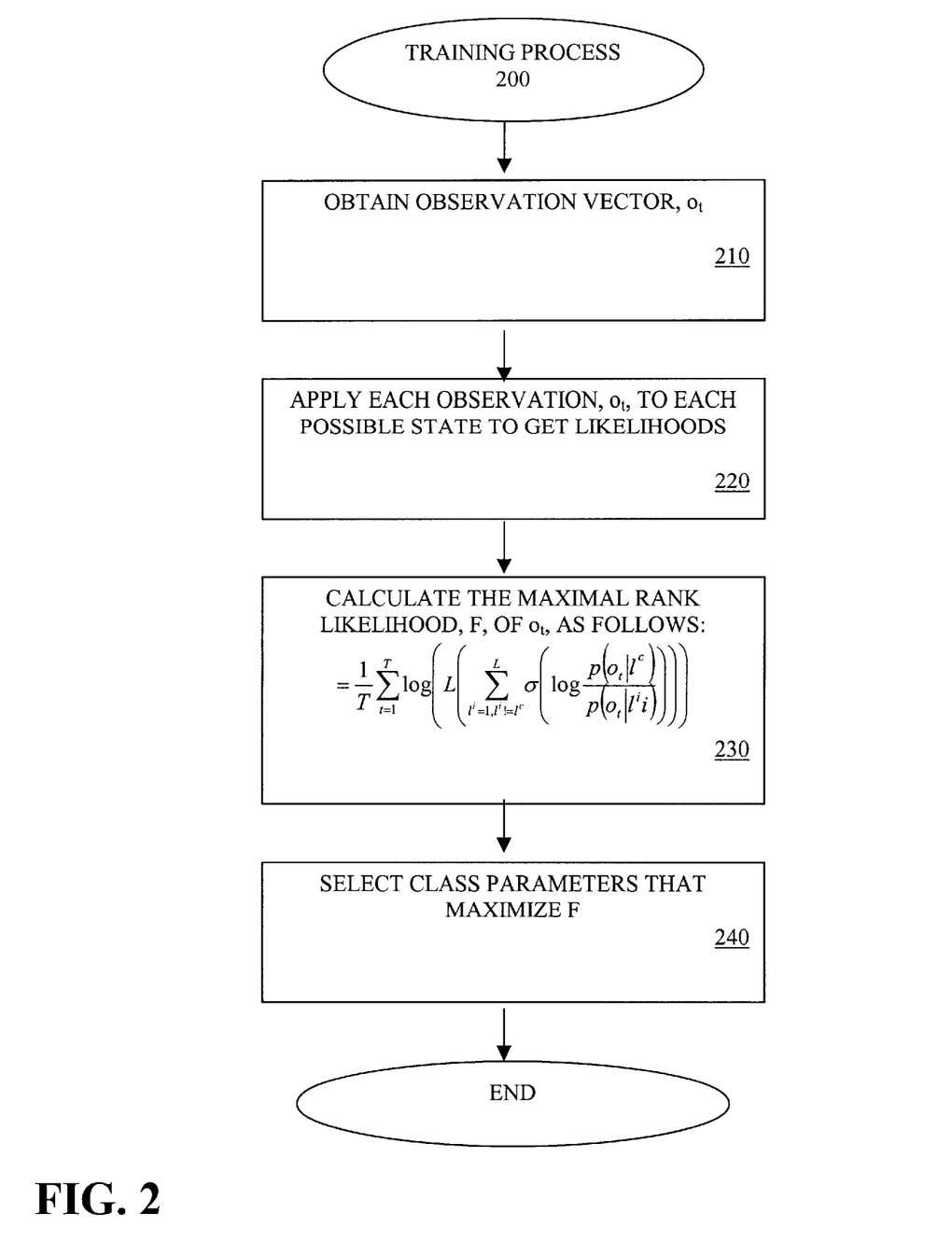
FIG. 2 is a flow describing an exemplary training process implemented by the pattern recognition system of FIG. 1 and incorporating features of the present invention.

As previoulsy indicated, the pattern recognition system 100 employs a training process 200, shown in FIG. 2, that utilizes the pseudo-rank likelihood objective function 160 to identify model parameters during the training phase that will result in a speech recognizer with the lowest possible recognition error rate. As shown in FIG. 2, the training process 200 initially obtains an observation sequence $O=(o_1, o_2, \ldots, o_T)$, during step 210. Thereafter, the training process 200 applies each observation to each possible state to obtain the likelihoods during step 220.

The training process calculates the rank likelihood (MRL), F, of the observation during step 230 using the pseudo-rank likelihood objective function 160 as follows:

$$= \frac{1}{T}\sum_{t=1}^{T}\log\left(L\left(\sum_{i^i=1,i^i!=i^c}^{L} \sigma\left(\log\frac{p(o_t|l^c)}{p(o_t|l^i i)}\right)\right)\right)$$

Finally, the training process selects the class (model) parameters during step 240 that maximize the objective function, F. Thereafter, program control terminates. Exemplary Applications Employing the Pseudo Rank Likelihood Objective Function Linear Discriminant Projection:

Linear Discriminant Analysis (LDA) is popularly used in speech recognition to reduce the dimension of the feature space and retain as much discriminating information as possible. LDA tries to find a $\theta$, which projects a feature vector from the original feature space to a new feature space with reduced dimensions by maximizing:

$$\frac{|\theta B \theta^T|}{|\theta W \theta^T|} \quad (9)$$

where, B and T are the between class covariance and total covariance, respectively.

A Linear Discriminant Projection (LDP) is one application of the objective function (Eq. 6) that can be used to replace Eq. 9. The LDP projects the feature vector $o_t$ into a new space with reduced dimensions: $o_t \rightarrow \theta o_t$. Thus, the LDP changes the model to a new space so that it is easier to separate classes.

When one Gaussian is used to model each state, $d\lambda(o_t, l^c, l^i)$ in Eq. 6 becomes:

$$2d(\theta o_t, l^c, l^i) = \log(p(\theta o_t|l^c)) - \log(p(\theta o_t|l^i)) \quad (10)$$

$$= -(o_t - m_{l c})^T \theta^T \text{diag}^{-1}\left(\theta \sum_{l^c} \theta^T\right)\theta(o_t - m_{l^c}) -$$

$$\log\left|\text{diag}\left(\theta \sum_{l^c} \theta^T\right)\right| +$$

$$(o_t - m_{l^i})^T \theta^T \text{diag}^{-1}\left(\theta \sum_{l^i} \theta^T\right)\theta(o_t - m_{l c}) +$$

$$\log\left|\text{diag}\left(\theta \sum_{l^i} \theta^T\right)\right|$$

The gradient is same as in Eq. 8, except $$\frac{\partial d_\lambda(o_t, l^c, l^i)}{\partial \lambda}$$

becomes $$\frac{\partial d(\theta o_t, l^c l^i)}{\partial \theta}$$

as follows:

$$= -\text{diag}^{-1}\left(\theta\sum_{l^c}\theta^T\right)\theta(o_t - m_{l^c})(o_t - m_{l^c})^T +$$

$$\text{diag}(\theta(o_t - m_{l^c})(o_i - m_{l^c})^T\theta^T)\text{diag}^{-2}\left(\theta\sum_{l^c}\theta^T\right)\theta\sum_{l^c} -$$

$$\text{diag}^{-1}\left(\theta\sum_{l^c}\theta^T\right)\theta\sum_{l^c} +$$

$$\text{diag}^{-1}\left(\theta\sum_{l^i}\theta^T\right)\theta(o_t - m_{l^i})(o_t - m_{l^i})^T -$$

$$\text{diag}(\theta(o_t - m_{l^i})(o_t - m_{l^i})^T\theta^T)\text{diag}^{-2}\left(\theta\sum_{l^i}\theta^T\right)\theta\sum_{l^i} +$$

$$\text{diag}^{-1}\left(\theta\sum_{l^i}\theta^T\right)\theta\sum_{l^i}$$

In Eq. 10, in order to simplify the gradient computation we take diagonal of $$\theta\sum_{l^c}\theta^T \text{ and } \theta\sum_{l^i}\theta^T$$

(since in most applications we use Gaussians with diagonal covariances).

Maximal Rank Likelihood Adaptation—A Feature Space Transformation (MRL-FST):

In the application of LDP described above, the gradient $$\frac{\partial F}{\partial \theta}$$

is computed for every frame of training speech. The computation cost is proportional to the amount of training speech, which makes the algorithm impractical when the amount of training data is huge. Thus, MRL-FST is an application that optimizes the feature space transformation on adaptation data, which is usually relatively small. In this application, the dimensions of the feature vector remain same, the transformation is optimized to maximize the rank likelihood of the adaptation data. For example, if a speech recognition system is initially trained for a large group of speakers, the MRL-FST allows more accurate recognition by transforming the adaptation data for a smaller group of speakers. Like the LDP above, the MRL-FST projects the feature vector $o_t$ into a new space: $o_t \rightarrow \theta o_t$.

When mixture of Gaussians is used to model a state, $p(o_t|l)$ becomes:

$$p(o_t|l) = \sum_{g=1}^{M} p_o^g p(o_t|G_l^g) \quad (11)$$

where, $p_o^g$ is the mixture weight for g-th Gaussian $G_l^g$ for state 1, $p(o_t|G_l^g)$ is the Gaussian likelihood of $o_t$ conditioned on the g-th Gaussian $G_l^g$.

$$p(o_t|G_l^g) = \frac{1}{(2\pi)^{\frac{d}{2}}\left|\sum_l^g\right|}\exp\left\{-\frac{1}{2}(\theta o_t - m_l^g)^T\left(\sum_l^g\right)^{-1}(\theta o_t - m_l^g)\right\} \quad (12)$$

The gradient becomes:

$$\frac{\partial d(o_t, l^c, l^i)}{\partial \theta} = -\sum_{g=1}^{M}\frac{1}{2}f_{l^c}^g\left(\sum_{l^c}^g\right)^{-1}(\theta o_t - m_{l^c}^g)(o_t)^T + \quad (13)$$

$$\sum_{g=1}^{M}\frac{1}{2}f_{l^i}^g\left(\sum_{l^i}^g\right)^{-1}(\theta o_t - m_{l^i}^g)(o_t)^T$$

where $$f_l^g = \frac{p_o^g p(o_t|G_l^g)}{\sum \frac{M}{g=1}p_o^g p(o_t|G_l^g)} \quad (14)$$

The $f_l^g$ can be viewed as normalization factors based on the posterior likelihoods.

Maximal Rank Likelihood Adaptation—A Model Space Transformation (MRL-MST):

Another application of the MRL estimation is also for speaker adaptation. Different from MRL-FST above, a model space linear transformation, which is applied to Gaussian means (similar to MLLR), can be computed to maximize the rank likelihood for observations. The objective function for this application is same as in Eq. 6, however, the Gaussian means become the adapted means $\hat{m}_l = \theta m_l$.

When Gaussian mixtures are used to model each state, $p(o_t|l)$ is same as in Eq. 11.

$$p(o_t|G_l^g) = \frac{1}{(2\pi)^{\frac{d}{2}}|\Sigma_l^g|}\exp\left\{-\frac{1}{2}(o_t - \theta m_l^g)^T\left(\sum_l^g\right)^{-1}(o_t - \theta m_l^g)\right\} \quad (15)$$

The gradient becomes:

$$\frac{\partial d(o_t, l^c, l^i)}{\partial \theta} = -\sum_{g=1}^{M}\frac{1}{2}f_{l^c}^g\left(\sum_{l^c}^g\right)^{-1}(o_t - \theta m_{l^c}^g)(m_{l^c}^g)^T + \quad (16)$$

$$\sum_{g=1}^{M}\frac{1}{2}f_{l^i}^g\left(\sum_{l^i}^g\right)^{-1}(o_t - \theta m_{l^i}^g)(m_{l^i}^g)^T$$

where, $f_l^g$ are normalization factors as in Eq. 14.

It is to be understood that the embodiments and variations shown and described herein are merely illustrative of the principles of this invention and that various modifications may be implemented by those skilled in the art without departing from the scope and spirit of the invention.

What is claimed is:

1. A method for selecting model parameters during a training phase of a pattern recognition system, comprising the steps of:

obtaining an observation sequence, $o_t$; and evaluating a pseudo-rank likelihood of said observation sequence, $o_t$, to obtain model parameters during said training phase, wherein said pseudo-rank likelihood transforms discrete features of a rank likelihood to generate parameter estimations during said training phase.

2. The method of claim 1, wherein said pseudo-rank likelihood is computed as follows:

$$= \frac{1}{T}\sum_{t=1}^{T}\log\left(L\left(\sum_{l^i=1, l^i\neq l^c}^{L}\sigma\left(\log\frac{p(o_t|l^c)}{p(o_t|l^i)}\right)\right)\right)$$

where $$L(r) = \frac{1}{r+1}, \sigma(x) = \frac{1}{1+e^{ax}},$$

is a likelihood of $o_t$ given the correct state $l^c$, and $p(o_t|l^i)$ is a likelihood of $o_t$ given any other state $l^i$, $l^i \in \{$all states in the underlying system$\}$.

3. The method of claim 1, wherein said pseudo-rank likelihood transforms discrete features of a rank likelihood to allow parameter estimations to be optimized during said training phase.

4. The method of claim 1, wherein said pseudo-rank likelihood is optimized using all training data to project feature vectors into a discriminative space with a reduced dimension.

5. The method of claim 1, wherein said pseudo-rank likelihood is optimized using adaptation data to perform a feature space transformation for adaptation.

6. The method of claim 1, wherein said pseudo-rank likelihood is optimized using adaptation data to perform a model space transformation for adaptation.

7. The method of claim 1, wherein said pseudo-rank likelihood objective function is evaluated using a gradient search.

8. The method of claim 1, wherein said pattern recognition system is a speech recognition system.

9. A method for selecting model parameters during a training phase of a pattern recognition system, comprising the steps of:

obtaining an observation sequence, $o_t$; and evaluating a pseudo-rank likelihood objective function of said observation sequence, $o_t$, to obtain model parameters during said training phase, wherein said pseudo-rank likelihood objective function maximizes a likelihood of an observation for a correct class, and minimizes the likelihoods of said observation for all other classes such that the discrimination between said classes is maximized and wherein said pseudo-rank likelihood transforms discrete features of a rank likelihood to generate parameter estimations during said training phase.

10. The method of claim 9, wherein said pseudo-rank likelihood is computed as follows:

$$= \frac{1}{T}\sum_{t=1}^{T} \log\left(L\left(\sum_{l^i=1, l^i \neq l^c}^{L} \sigma\left(\log\frac{p(o_t|l^c)}{p(o_t|l^i)}\right)\right)\right)$$

where $$L(r) = \frac{1}{r+1}, \sigma(x) = \frac{1}{1+e^{ax}},$$

is a likelihood of $o_t$ given the correct state $l^c$, and $p(o_t|l^i)$ is a likelihood of $o_t$ given any other state $l^i$, $l^i \in \{$all states in the underlying system$\}$.

11. The method of claim 9, wherein said pseudo-rank likelihood objective function is evaluated using a gradient search.

12. A method for selecting parameters, comprising the steps of:

obtaining an observation sequence, $o_t$; and evaluating a maximal rank likelihood objective function of said observation sequence, $o_t$, to obtain said parameters, wherein said maximal rank likelihood transforms discrete features of a rank likelihood to generate parameter estimations during said training phase.

13. The method of claim 12, wherein said maximal rank likelihood is computed as follows:

$$= \frac{1}{T}\sum_{t=1}^{T} \log\left(L\left(\sum_{l^i=1, l^i \neq l^c}^{L} \sigma\left(\log\frac{p(o_t|l^c)}{p(o_t|l^i)}\right)\right)\right)$$

where $$L(r) = \frac{1}{r+1}, \sigma(x) = \frac{1}{1+e^{ax}},$$

is a likelihood of $o_t$ given the correct state $l_c$, and $p(o_t|l^i)$ is a likelihood of $o_t$ given any other state $l^i$, $l^i \in \{$all states in the underlying system$\}$.

14. The method of claim 13, wherein said maximal rank likelihood is evaluated using a gradient search.

15. A method for selecting model parameters during a training phase of a pattern recognition system, comprising the steps of:

obtaining an observation sequence, $o_t$; and evaluating a pseudo-rank likelihood objective function of said observation sequence, $o_t$, to obtain model parameters during said training phase, wherein said pseudo-rank likelihood objective function is evaluated using a gradient search.

16. The method of claim 15, wherein said pseudo-rank likelihood is computed as follows:

$$= \frac{1}{T}\sum_{t=1}^{T} \log\left(L\left(\sum_{l^i=1, l^i \neq l^c}^{L} \sigma\left(\log\frac{p(o_t|l^c)}{p(o_t|l^i)}\right)\right)\right)$$

where $$L(r) = \frac{1}{r+1}, \sigma(x) = \frac{1}{1+e^{ax}},$$

is a likelihood of $o_t$ given the correct state $l^c$, and $p(o_t|l^i)$ is a likelihood of $o_t$ given any other state $l^i$, $l^i \in \{$all states in the underlying system$\}$.

17. A method for selecting parameters for an acoustic model during a training phase of a speech recognition system, comprising the steps of:

obtaining an observation sequence, $o_t$, of speech; and evaluating a pseudo-rank likelihood of said observation sequence, $o_t$, to obtain model parameters during said training phase of said speech recognition system, wherein said pseudo-rank likelihood transforms discrete features of a rank likelihood to generate parameter estimations during said training phase.

18. The method of claim 17, wherein said speech is pulse-code modulated speech samples.

19. The method of claim 17, wherein said pseudo-rank likelihood is computed as follows:

$$= \frac{1}{T}\sum_{t=1}^{T} \log\left(L\left(\sum_{i^i=1, i^i 1=l^c}^{L} \sigma\left(\log\frac{p(o_t|l^c)}{p(o_t|l^i i)}\right)\right)\right)$$

where $$L(r) = \frac{1}{r+1}, \sigma(x) = \frac{1}{1+e^{\alpha x}},$$

is a likelihood of $o_t$ given the correct state $l^c$, and $p(o_t|l^i)$ is a likelihood of $o_t$ given any other state $l^i$, $l^i \in$ {all states in the underlying system}.

20. A system for selecting model parameters during a training phase of a pattern recognition system, comprising:
 a memory that stores computer-readable code; and
 a processor operatively coupled to said memory, said processor configured to implement said computer-readable code, said computer-readable code configured to:
 obtain an observation sequence, $o_t$; and
 evaluate a pseudo-rank likelihood of said observation sequence, $o_t$, to obtain model parameters during said training phase, wherein said pseudo-rank likelihood transforms discrete features of a rank likelihood to generate parameter estimations during said training phase.

21. The system of claim 20, wherein said pseudo-rank likelihood is computed as follows:

$$= \frac{1}{T}\sum_{t=1}^{T} \log\left(L\left(\sum_{i^i=1, i^i 1=l^c}^{L} \sigma\left(\log\frac{p(o_t|l^c)}{p(o_t|l^i i)}\right)\right)\right)$$

where $$L(r) = \frac{1}{r+1}, \sigma(x) = \frac{1}{1+e^{\alpha x}},$$

is a likelihood of $o^t$ given the correct state $l^c$, and $p(o_t|l^i)$ is a likelihood of $o_t$ given any other state $l^i$, $l^i \in$ {fall states in the underlying system}.

22. A system for selecting model parameters during a training phase of a pattern recognition system, comprising:
 a memory that stores computer-readable code; and
 a processor operatively coupled to said memory, said processor configured to implement said computer-readable code, said computer-readable code configured to:
 obtain an observation sequence, $o_t$; and
 evaluate a pseudo-rank likelihood objective function of said observation sequence, $o_t$, to obtain model parameters during said training phase, wherein said pseudo-rank likelihood objective function maximizes a likelihood of an observation for a correct class, and minimizes the likelihoods of said observation for all other classes such that the discrimination between said classes is maximized, wherein said pseudo-rank likelihood transforms discrete features of a rank likelihood to generate parameter estimations during said training phase.

23. The system of claim 22 wherein said pseudo-rank likelihood is computed as follows:

$$= \frac{1}{T}\sum_{t=1}^{T} \log\left(L\left(\sum_{i^i=1, i^i 1=l^c}^{L} \sigma\left(\log\frac{p(o_t|l^c)}{p(o_t|l^i i)}\right)\right)\right)$$

where $$L(r) = \frac{1}{r+1}, \sigma(x) = \frac{1}{1+e^{\alpha x}},$$

is a likelihood of $o_t$ given the correct state $l^c$, and $p(o_t|l^i)$ is a likelihood of $o_t$ given any other state $l^i$, $l^i \in$ {all states in the underlying system}.

24. A system for selecting model parameters during a training phase of a pattern recognition system, comprising:
 a memory that stores computer-readable code; and
 a processor operatively coupled to said memory, said processor configured to implement said computer-readable code, said computer-readable code configured to:
 obtain an observation sequence, $o_t$; and
 evaluate a pseudo-rank likelihood objective function of said observation sequence, $o_t$, to obtain model parameters during said training phase, wherein said pseudo-rank likelihood objective function is evaluated using a gradient search.

25. The system of claim 24, wherein said pseudo-rank likelihood is computed as follows:

$$= \frac{1}{T}\sum_{t=1}^{T} \log\left(L\left(\sum_{i^i=1, i^i 1=l^c}^{L} \sigma\left(\log\frac{p(o_t|l^c)}{p(o_t|l^i i)}\right)\right)\right)$$

where $$L(r) = \frac{1}{r+1}, \sigma(x) = \frac{1}{1+e^{\alpha x}},$$

is a likelihood of $o_t$ given the correct state $l^c$, and $p(o_t|l^i)$ is a likelihood of $o_t$ given any other state $l^i$, $l^i \in$ {all states in the underlying system}.

26. A system for selecting parameters for an acoustic model during a training phase of a speech recognition system, comprising:
 a memory that stores computer-readable code; and
 a processor operatively coupled to said memory, said processor configured to implement said computer-readable code, said computer-readable code configured to:
 obtain an observation sequence, $o_t$, of speech; and
 evaluate a pseudo-rank likelihood of said observation sequence, $o_t$, to obtain model parameters during said training phase of said speech recognition system, wherein said pseudo-rank likelihood transforms discrete features of a rank likelihood to generate parameter estimations during said training phase.

27. The system of claim 26, wherein said speech is pulse-code modulated speech samples.

28. The system of claim 26, wherein said pseudo-rank likelihood is computed as follows:

$$= \frac{1}{T}\sum_{t=1}^{T}\log\left(L\left(\sum_{l^i=1, l^i 1=l^c}^{L}\sigma\left(\log\frac{p(o_t|l^c)}{p(o_t|l^i i)}\right)\right)\right)$$

where $$L(r) = \frac{1}{r+1}, \sigma(x) = \frac{1}{1+e^{\alpha x}},$$

is a likelihood of $o_t$ given the correct state $l^c$, and $p(o_t|l^i)$ is a likelihood of $o_t$ given any other state $l^i$, $l^i \in \{$all states in the underlying system$\}$.

29. An article of manufacture for selecting model parameters during a training phase of a pattern recognition system, comprising:

a computer readable medium having computer readable code means embodied thereon, said computer readable program code means comprising:

a step to obtain an observation sequence, $o_t$; and a step to evaluate a pseudo-rank likelihood of said observation sequence, $o_t$, to obtain model parameters during said training phase, wherein said pseudo-rank likelihood transforms discrete features of a rank likelihood to generate parameter estimations during said training phase.

30. An article of manufacture for selecting model parameters during a training phase of a pattern recognition system, comprising:

a computer readable medium having computer readable code means embodied thereon, said computer readable program code means comprising:

a step to obtain an observation sequence, $o_t$; and a step to evaluate a pseudo-rank likelihood objective function of said observation sequence, $o_t$, to obtain model parameters during said training phase, wherein said pseudo-rank likelihood objective function maximizes a likelihood of an observation for a correct class, and minimizes the likelihoods of said observation for all other classes such that the discrimination between said classes is maximized and wherein said pseudo-rank likelihood transforms discrete features of a rank likelihood to generate parameter estimations during said training phase.

31. An article of manufacture for selecting parameters for an acoustic model during a training phase of a speech recognition system, comprising:

a computer readable medium having computer readable code means embodied thereon, said computer readable program code means comprising:

a step to obtain an observation sequence, $o_t$, of speech; and a step to evaluate a pseudo-rank likelihood of said observation sequence, $o_t$, to obtain model parameters during said training phase of said speech recognition system, wherein said pseudo-rank likelihood transforms discrete features of a rank likelihood to generate parameter estimations during said training phase.

* * * * *

UNITED STATES PATENT AND TRADEMARK OFFICE
CERTIFICATE OF CORRECTION

PATENT NO. : 6,850,888 B1
DATED : February 1, 2005
INVENTOR(S) : Gao et al.

It is certified that error appears in the above-identified patent and that said Letters Patent is hereby corrected as shown below:

Title page,
Item [57], ABSTRACT,
Line 4, before "process" and after "the" replace "decding" with -- decoding --.

Column 1,
Line 35, before "need" and after "observation" delete "needs".

Column 3,
Lines 60-61, replace " $r(o_t) = \sum_{l^i=1, l^i \ne l^c}^{L} \sigma(\log \frac{p(o_t|l^c)}{p(o_t|l^i i)})$ " with -- $r(o_t) = \sum_{l^i=1, l^i \ne l^c}^{L} u(\log \frac{p(o_t|l^c)}{p(o_t|l^i i)})$ --.

Lines 64 and 65, before "given" and after "of" replace "o$^t$" with -- o$_t$ --.
Line 66, before "states" and after "all" insert -- HMM --.

Column 4,
Line 2, replace "1 if x 5.0" with -- 1 if x $\leq$ 0 --.
Line 22, before "So" and after "to" replace "$p(o_t|l^i)$" with -- $p(o_t|l^c)$ --.

Column 7,
Line 5, replace " $diag(\theta(o_t - m_{l^c})(o_i - m_{l^c})^T \theta^T) diag^{-2}(\theta \sum_{l^c} \theta^T) \theta \sum_{l^c} -$ " with -- $diag(\theta(o_t - m_{l^c})(o_t - m_{l^c})^T \theta^T) diag^{-2}(\theta \sum_{l^c} \theta^T) \theta \sum_{l^c} -$ --.

Column 8,
Line 26, before "is same as in Eq. 11" replace "$p(o_t|l)$" with -- $p(o_t|l)$ --.

Column 9,
Line 57, before "is a likelihood of o$_t$, given the correct state 1$^c$" insert -- $p(o_t|l^c)$ --.

Column 10,
Lines 9-10, replace " $= \frac{1}{T} \sum_{t=1}^{T} \log(L(\sum_{l^i=1,l^i \ne l^c}^{L} \sigma(\log \frac{p(o_t|l^c)}{p(o_t|l^i i)})))$ " with -- $= \frac{1}{T} \sum_{t=1}^{T} \log(L(\sum_{l^i=1,l^i \ne l^c}^{L} \sigma(\log \frac{p(o_t|l^c)}{p(o_t|l^i i)})))$ --.

Line 19, before "is a likelihood of o$_t$, given the correct state 1$_c$" insert -- $p(o_t|l^c)$ --.
Line 19, before "and" and after "state" replace "1$_c$" with -- 1$^c$ --.

Lines 39-40, replace " $= \frac{1}{T} \sum_{t=1}^{T} \log(L(\sum_{l^i=1,l^i \ne l^c}^{L} \sigma(\log \frac{p(o_t|l^c)}{p(o_t|l^i i)})))$ " with -- $= \frac{1}{T} \sum_{t=1}^{T} \log(L(\sum_{l^i=1,l^i \ne l^c}^{L} \sigma(\log \frac{p(o_t|l^c)}{p(o_t|l^i i)})))$ --.

Line 49, before "is a likelihood of o$_t$, given the correct state 1$^c$" insert -- $p(o_t|l^c)$ --.

UNITED STATES PATENT AND TRADEMARK OFFICE
CERTIFICATE OF CORRECTION

PATENT NO. : 6,850,888 B1
DATED : February 1, 2005
INVENTOR(S) : Gao et al.

It is certified that error appears in the above-identified patent and that said Letters Patent is hereby corrected as shown below:

Column 11,
Lines 3-4, replace " $= \frac{1}{T}\sum_{t=1}^{T}\log(L(\sum_{l'=1,l'=l^c}^{L}\sigma(\log\frac{p(o_t|l^c)}{p(o_t|l'i)})))$ " with -- $= \frac{1}{T}\sum_{t=1}^{T}\log(L(\sum_{l'=1,l'\ne l^c}^{L}\sigma(\log\frac{p(o_t|l^c)}{p(o_t|l'i)})))$ --.

Line 12, before "is a likelihood of $o^t$, given the correct state $1^c$" insert -- $p(o_t|l^c)$ --.
Line 43, before "is a likelihood of $o_t$, given the correct state $1^c$" insert -- $p(o_t|l^c)$ --.

Lines 34-35, replace " $= \frac{1}{T}\sum_{t=1}^{T}\log(L(\sum_{l'=1,l'=l^c}^{L}\sigma(\log\frac{p(o_t|l^c)}{p(o_t|l'i)})))$ " with -- $= \frac{1}{T}\sum_{t=1}^{T}\log(L(\sum_{l'=1,l'\ne l^c}^{L}\sigma(\log\frac{p(o_t|l^c)}{p(o_t|l'i)})))$ --.

Line 43, before "given" and after "of" replace "$o^t$" with -- $o_t$ --.

Column 12,
Lines 3-4, replace " $= \frac{1}{T}\sum_{t=1}^{T}\log(L(\sum_{l'=1,l'=l^c}^{L}\sigma(\log\frac{p(o_t|l^c)}{p(o_t|l'i)})))$ " with -- $= \frac{1}{T}\sum_{t=1}^{T}\log(L(\sum_{l'=1,l'\ne l^c}^{L}\sigma(\log\frac{p(o_t|l^c)}{p(o_t|l'i)})))$ --.

Lines 12 and 44, before "is a likelihood of $o_t$, given the correct state $1^c$" insert -- $p(o_t|l^c)$ --.

Lines 34-35, replace " $= \frac{1}{T}\sum_{t=1}^{T}\log(L(\sum_{l'=1,l'=l^c}^{L}\sigma(\log\frac{p(o_t|l^c)}{p(o_t|l'i)})))$ " with -- $= \frac{1}{T}\sum_{t=1}^{T}\log(L(\sum_{l'=1,l'\ne l^c}^{L}\sigma(\log\frac{p(o_t|l^c)}{p(o_t|l'i)})))$ --.

Column 13,
Lines 3-4, replace " $= \frac{1}{T}\sum_{t=1}^{T}\log(L(\sum_{l'=1,l'=l^c}^{L}\sigma(\log\frac{p(o_t|l^c)}{p(o_t|l'i)})))$ " with -- $= \frac{1}{T}\sum_{t=1}^{T}\log(L(\sum_{l'=1,l'\ne l^c}^{L}\sigma(\log\frac{p(o_t|l^c)}{p(o_t|l'i)})))$ --.

Line 12, before "is a likelihood of $o_t$, given the correct state $1^c$" insert -- $p(o_t|l^c)$ --.

Signed and Sealed this

Fifteenth Day of November, 2005

JON W. DUDAS
*Director of the United States Patent and Trademark Office*

UNITED STATES PATENT AND TRADEMARK OFFICE
CERTIFICATE OF CORRECTION

PATENT NO. : 6,850,888 B1
DATED : February 1, 2005
INVENTOR(S) : Gao et al.

It is certified that error appears in the above-identified patent and that said Letters Patent is hereby corrected as shown below:

Column 9,
Line 6, before "is a likelihood of $o_t$, given the correct state $l^c$" insert -- $p(o_t|l^c)$ --.

Signed and Sealed this

Third Day of January, 2006

JON W. DUDAS
*Director of the United States Patent and Trademark Office*